United States Patent
Fuller et al.

(10) Patent No.: US 12,410,869 B2
(45) Date of Patent: Sep. 9, 2025

(54) TWO-PIN CLAPPER CHECK VALVE

(71) Applicant: SPM Oil & Gas Inc., Fort Worth, TX (US)

(72) Inventors: Nadiya V. Fuller, Plano, TX (US); Brian C. Witkowski, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 134 days.

(21) Appl. No.: 18/456,553

(22) Filed: Aug. 28, 2023

(65) Prior Publication Data

US 2024/0117889 A1 Apr. 11, 2024

Related U.S. Application Data

(60) Provisional application No. 63/378,544, filed on Oct. 6, 2022.

(51) Int. Cl.
*F16K 15/03* (2006.01)

(52) U.S. Cl.
CPC .................................. *F16K 15/03* (2013.01)

(58) Field of Classification Search
CPC ........ F16K 15/03; F16K 15/033; F16K 15/034
See application file for complete search history.

(56) References Cited

U.S. PATENT DOCUMENTS

| | | | |
|---|---|---|---|
| 3,883,111 | A | 5/1975 | Jourdan |
| 4,120,318 | A | 10/1978 | Jourdan |
| 6,668,858 | B1 | 12/2003 | Bazargan |
| 7,152,622 | B2 * | 12/2006 | Scaramucci .......... F16K 15/033 137/527.2 |
| 8,128,058 | B2 | 3/2012 | Quinn et al. |
| 8,261,771 | B2 | 9/2012 | Witkowski et al. |
| 10,197,172 | B2 | 2/2019 | Fuller et al. |
| 11,353,125 | B2 | 6/2022 | Crawford |
| 11,365,819 | B2 | 6/2022 | Fuller et al. |
| 2021/0372536 | A1 * | 12/2021 | Crawford ................ F16K 15/03 |
| 2022/0018446 | A1 | 1/2022 | Witkowski |

* cited by examiner

*Primary Examiner* — Daphne M Barry

(57) ABSTRACT

In some implementations, a clapper valve assembly includes a valve body defining a longitudinal flow bore, a hanger disposed in the valve body, a link piece coupled to the hanger, a first pin coupled between the hanger and the link piece, wherein the link piece is configured to rotate, relative to the hanger, about the first pin, a clapper coupled to the link piece, and a second pin coupled between the link piece and the clapper, wherein the clapper is configured to rotate, relative to the link piece, about the second pin.

18 Claims, 4 Drawing Sheets

TWO-PIN CLAPPER CHECK VALVE

CROSS-REFERENCE TO RELATED APPLICATION

This Patent Application claims priority to U.S. Patent Application No. 63/378,544, filed on Oct. 6, 2022. The disclosure of the prior Application is considered part of and is incorporated by reference into this Patent Application.

TECHNICAL FIELD

The present disclosure relates generally to a check valve and, for example, to a clapper valve assembly with a two-pin design.

BACKGROUND

In oil and gas operations (e.g., production of a subterranean wellbore, hydraulic fracturing operations, or other operations), a check valve (e.g., clapper valve) may be used to control the flow of fluids (e.g., production fluids, hydraulic fracturing fluids, or other fluids) by preventing backflow. The clapper may stay open during forward flow and close, as a result of gravitation and/or pressure differential, during backflow. Dynamic loading and/or abrasion caused by fluid flow through the clapper valve (e.g., including the effects of flow dynamics that cause cavitation and cyclic loading on parts) may cause significant wear to internal components of the clapper valve. Moreover, friction and wear caused by linear and/or rotary movement of parts (e.g., pins, pin holes, slots, or other parts) may shorten the life of those parts. Replacement and/or repair of worn parts is inefficient, time-consuming, and costly.

The apparatus of the present disclosure solves one or more of the problems set forth above and/or other problems in the art.

SUMMARY

In some implementations, a clapper valve assembly includes a valve body defining a longitudinal flow bore; a hanger disposed in the valve body and including a slot; a link piece, including a link body; and first and second pin holes defined in the link body; a first pin disposed in both the slot of the hanger and the first pin hole of the link body, wherein the first pin defines a first rotation axis, and wherein the link piece is configured to rotate about the first rotation axis; a clapper, including a clapper body; a third pin hole defined in the clapper body; and a seal; a second pin disposed in both the second pin hole of the link body and the third pin hole of the clapper body, wherein the second pin defines a second rotation axis, and wherein the clapper is configured to rotate about the second rotation axis; and a valve seat disposed in the valve body.

In some implementations a link assembly for coupling a clapper to a hanger of a clapper valve includes a link piece, including a link body; and first and second pin holes defined in the link body; a first pin disposed in the first pin hole of the link body, wherein the first pin defines a first rotation axis, and wherein the link piece is configured to rotate, relative to the hanger, about the first rotation axis; and a second pin disposed in the second pin hole of the link body, wherein the second pin defines a second rotation axis, and wherein the clapper is configured to rotate, independently of the link piece, about the second rotation axis.

In some implementations a clapper valve assembly includes a valve body defining a longitudinal flow bore; a hanger disposed in the valve body; a link piece coupled to the hanger; a first pin coupled between the hanger and the link piece, wherein the link piece is configured to rotate, relative to the hanger, about the first pin; a clapper coupled to the link piece; and a second pin coupled between the link piece and the clapper, wherein the clapper is configured to rotate, relative to the link piece, about the second pin.

DETAILED DESCRIPTION

This disclosure relates to a clapper valve assembly, which is applicable to any process that controls the flow of fluids (e.g., production fluids, hydraulic fracturing fluids, or other fluids). The term "process" may refer to an operation associated with an industry such as, for example, oil and gas, refining, mining, construction, farming, transportation, or another industry. The clapper valve assembly, described herein, uses a two-pin design with a link piece to reduce friction and wear. In addition, the clapper valve assembly, described herein, may use materials (e.g., tool steel for all components) that reduce wear. As a result, replacement and/or repair of the clapper valve assembly is reduced, which drives efficiency, time savings, and cost savings.

Figure 1:
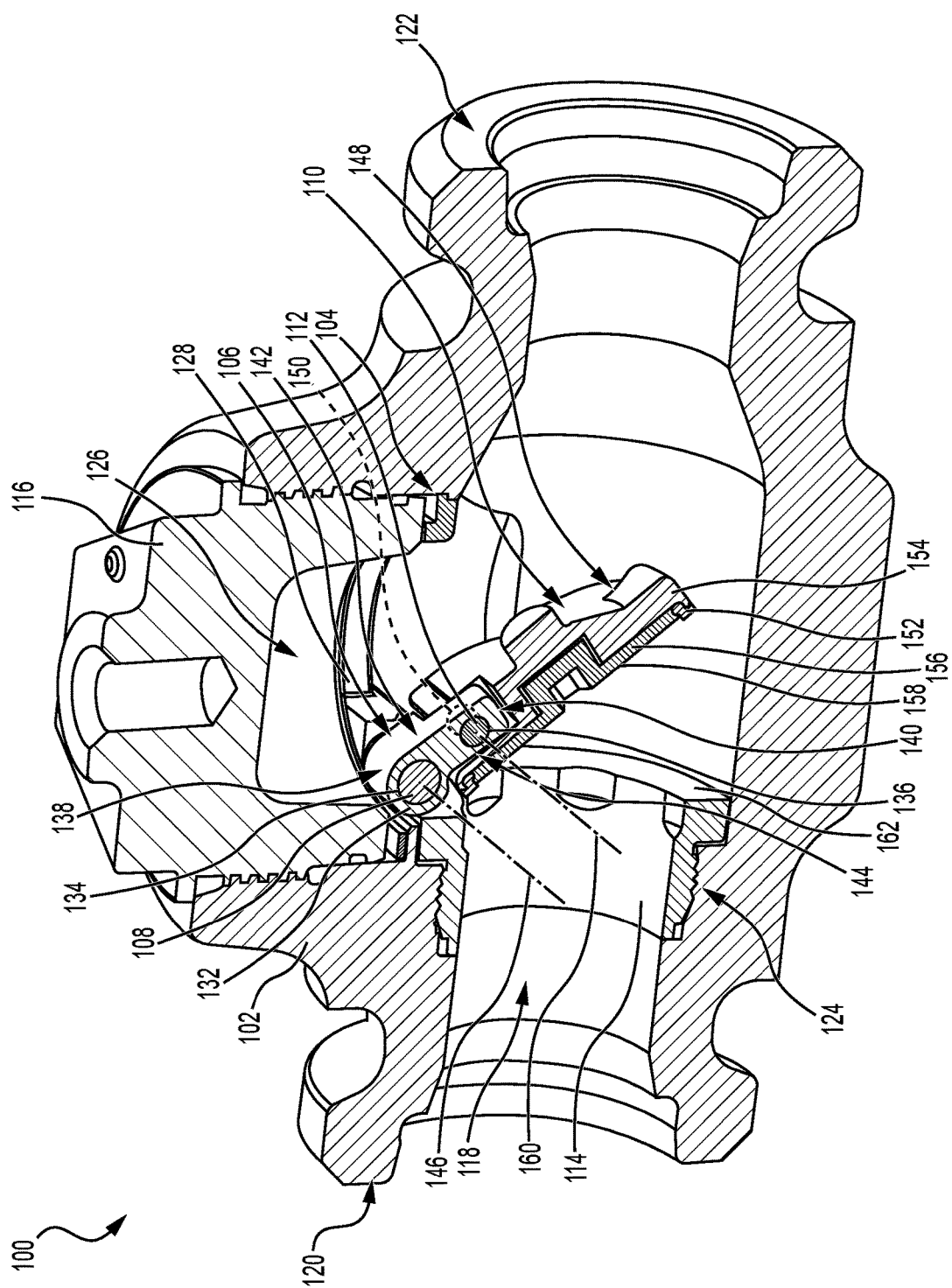
FIG. 1 is a diagram of a perspective section view of an example clapper valve assembly described herein.

FIG. 1 is a diagram of a perspective section view of an example clapper valve assembly 100 described herein. In some examples, the clapper valve assembly 100 may include less equipment, additional equipment, or alternative equipment compared to the example depicted in FIG. 1.

The clapper valve assembly 100 may include a valve body 102, a hanger 104 disposed in the valve body 102, a link piece 106, a first pin 108, a clapper 110, a second pin 112, a valve seat 114 disposed in the valve body 102, and a cap 116.

The valve body 102 may define a longitudinal flow bore 118. The valve body 102 may include an inlet 120 and an outlet 122 defined at opposite ends of the longitudinal flow bore 118. The longitudinal flow bore 118 may be in fluid communication with flow lines (e.g., conduits, piping, tubing, or other flow lines) connected upstream of the inlet 120 and downstream of the outlet 122. The inlet 120 and outlet 122 may include connections (e.g., flanged, bolted, threaded, or other connections) configured to be coupled to the flow lines.

The valve body 102 may be formed (e.g., cast, machined, or otherwise formed) as a single piece or assembled from multiple pieces. The valve body 102 may be formed from a steel material (e.g., carbon steel, alloy steel, tool steel, or other steel materials). The valve body 102 may include a connection 124 (e.g., threaded, fastened, or other connections), defined in the longitudinal flow bore 118, to couple the valve seat 114 to the valve body 102. The connection 124 may include a recess. The valve body 102 may include a transverse bore 126, defined perpendicular to the longitudinal flow bore 118, to receive the cap 116 in the valve body 102. The transverse bore 126 may include a connection to couple the cap 116 to the valve body 102.

The hanger 104 may include a hanger body 128 configured to be coupled to the valve body 102. The hanger body 128 may be annular in shape having a step that rests on a corresponding shoulder of the transverse bore 126. The hanger body 128 may include a hinge section disposed along at least a radial portion thereof. The hanger body 128 may include a slot 130 (see FIG. 2, inset) defined in the hinge section of the hanger body 128. The slot 130 may be oblong in shape (e.g., oval, rectangle, or other oblong shapes) to allow linear movement (e.g., sliding) of the first pin 108 within the slot 130 in a direction parallel to the longitudinal flow bore 118.

The link piece 106 may be coupled to the hanger 104 via the first pin 108. The link piece 106 may include a link body 132 and first and second pin holes 134, 136 defined in the link body 132. The first and second pin holes 134, 136 may be disposed parallel to each other and/or perpendicular to the longitudinal flow bore 118. The second pin hole 136 may have a smaller inner diameter than the first pin hole 134.

The link body 132 may include a first end 138 defining a rounded edge corresponding to the first pin hole 134. The link body 132 has a first width, measured parallel to the first pin hole 134, and a first depth d1 (see FIG. 3) at the first end 138. The link body 132 may include a second end 140 corresponding to the second pin hole 136. The link body 132 has a second width, measured parallel to the second pin hole 136, and a second depth d2 (see FIG. 3) at the second end 140. The second width may be less than the first width at least because the link body 132 may be narrower towards the second end 140 in order to fit inside a corresponding notch in the clapper 110. Likewise, the second depth d2 may be less than the first depth d1 (see FIG. 3).

The link body 132 may include a forward-facing surface 142 connecting the first and second ends 138, 140. The forward-facing surface 142 may be configured to face towards the outlet 122 of the longitudinal flow bore 118 when the clapper 110 is in a closed position (see FIG. 3). The link body 132 may include a backward-facing surface 144 connecting the first and second ends 138, 140. The backward-facing surface 144 may be configured to face towards the inlet 120 of the longitudinal flow bore 118 when the clapper 110 is in the closed position (see FIG. 3). A length of the backward-facing surface 144 defined between the rounded edge and the second end 140 may be less than a length of the forward-facing surface 142. The first and second widths of the link body 132 may be defined, parallel to the first and second pin holes 134, 136, in relation to either the forward-facing surface 142, the backward-facing surface 144, or both.

The first pin 108 may be disposed in both the slot 130 of the hanger 104 and the first pin hole 134 of the link body 132. The first pin 108 may define a first rotation axis 146. The first rotation axis 146 may be perpendicular to the longitudinal flow bore 118. The link piece 106 may be configured to rotate, relative to the hanger 104, about the first rotation axis 146 via the first pin 108.

The clapper 110 may include a clapper body 148, a third pin hole 150 (shown in phantom) defined in the clapper body 148, and a seal 152 coupled to the clapper body 148. The third pin hole 150 may be disposed parallel to the first and second pin holes 134, 136 and/or perpendicular to the longitudinal flow bore 118. The third pin hole 150 may have an equal inner diameter to the second pin hole 136.

The clapper body 148 may be formed (e.g., cast, machined, or otherwise formed) as a single piece or assembled from multiple pieces. As shown in FIG. 1, the clapper body 148 includes a hinge 154 coupled to the link piece 106, via the second pin 112, and an insert 156 coupled to the hinge 154. During operation, after the seal 152 is compressed, a face 158 of the insert 156 may be configured to make final contact with the valve seat 114 in a hard stop position (see FIG. 4).

The seal 152 may be fit (e.g., sandwiched, compressed, or other fits) between the hinge 154 and the insert 156. The seal 152 may be annular in shape to seal around a circumference of the longitudinal flow bore 118. The seal may be formed from an elastomeric material (e.g., urethane or other elastomers).

The second pin 112 may be disposed in both the second pin hole 136 of the link body 132 and the third pin hole 150 of the clapper body 148. The second pin 112 may define a second rotation axis 160. The second rotation axis 160 may be perpendicular to the longitudinal flow bore 118. The clapper 110 may be configured to rotate, relative to the link piece 106, about the second rotation axis 160 via the second pin 112. The first and second pins 108, 112 may be disposed parallel to each other. The second pin 112 may be nearer a centerline of the longitudinal flow bore 118, compared to the first pin 108, when the clapper 110 is in the closed position (see FIG. 3). The second pin 112 may have a smaller outer diameter than the first pin 108.

In some examples, all of the internal components of the clapper valve assembly 100 that may experience friction and/or wear caused by one or more of fluid flow induced dynamic loading and/or abrasion or linear and/or rotary movement of parts (e.g., the hanger 104, link piece 106, first pin 108, clapper 110, and second pin 112) may be formed from the same material (e.g., tool steel) to reduce wear.

The valve seat 114 may be coupled to the valve body 102 via the connection 124. The valve seat 114 may be disposed in the recess of the longitudinal flow bore 118. The valve seat 114 may include an opening aligned with the longitudinal flow bore 118. The valve seat 114 may include a face 162 configured to make initial contact with the seal 152 in the closed position (see FIG. 3). The face 162 may be configured to make final contact with the face 158 of the insert 156 in the hard stop position (see FIG. 4).

As indicated above, FIG. 1 is provided as an example. Other examples may differ from what was described in connection with FIG. 1.

INDUSTRIAL APPLICABILITY

Figure 2:
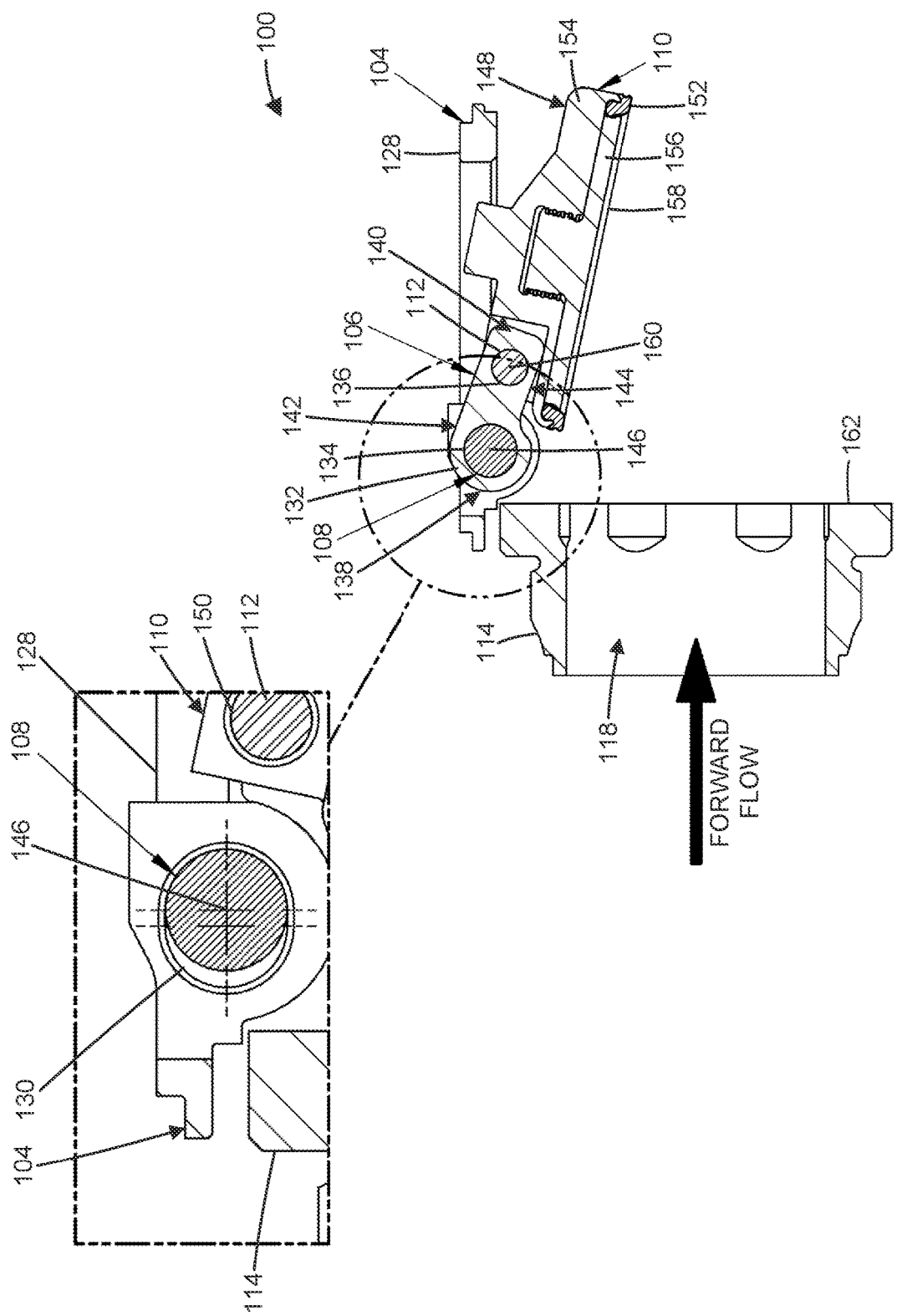
FIG. 2 is a diagram of a side section view of the example clapper valve assembly, described herein, in an open position.
Figure 3:
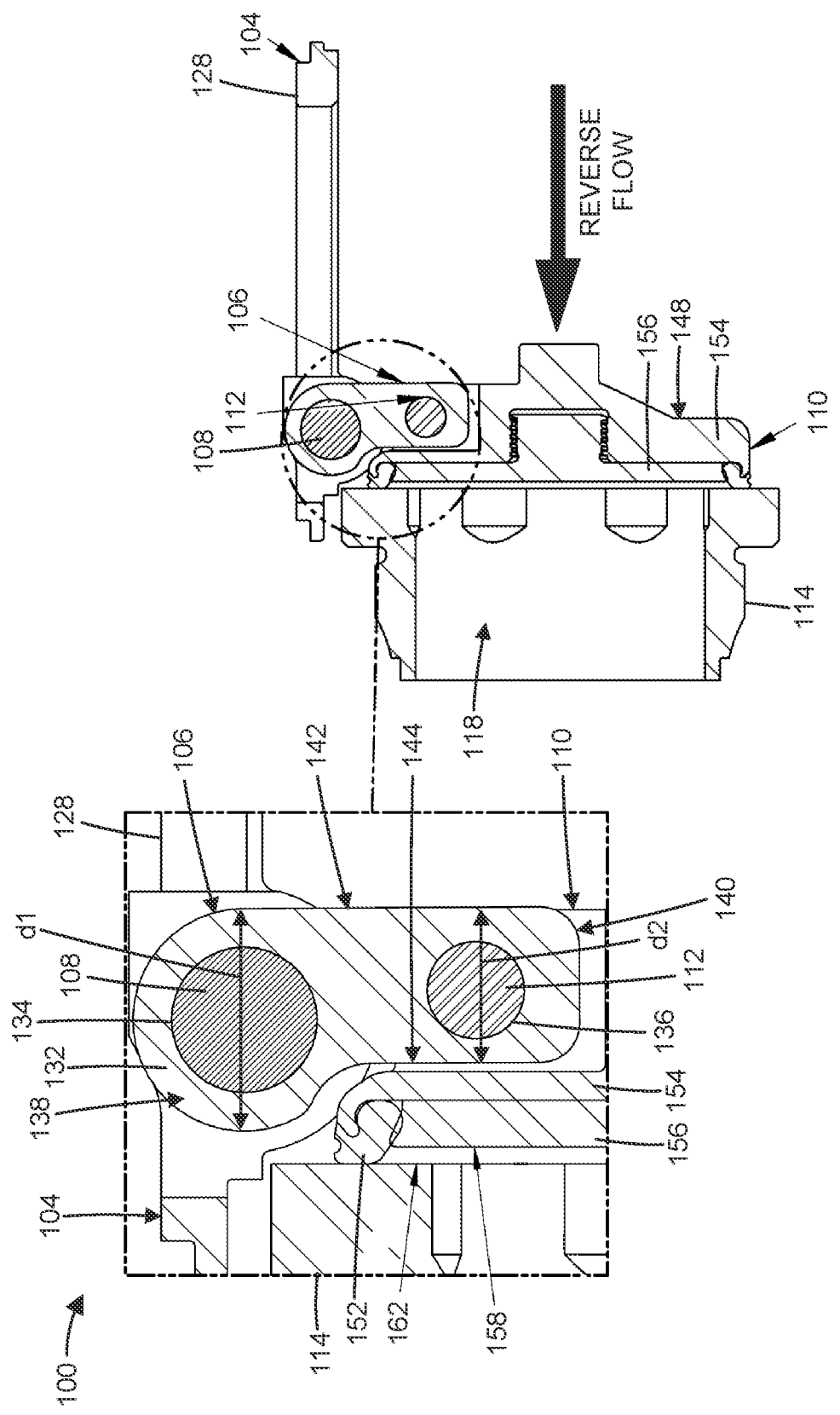
FIG. 3 is a diagram of a side section view of the example clapper valve assembly, described herein, in a closed position.
Figure 4:
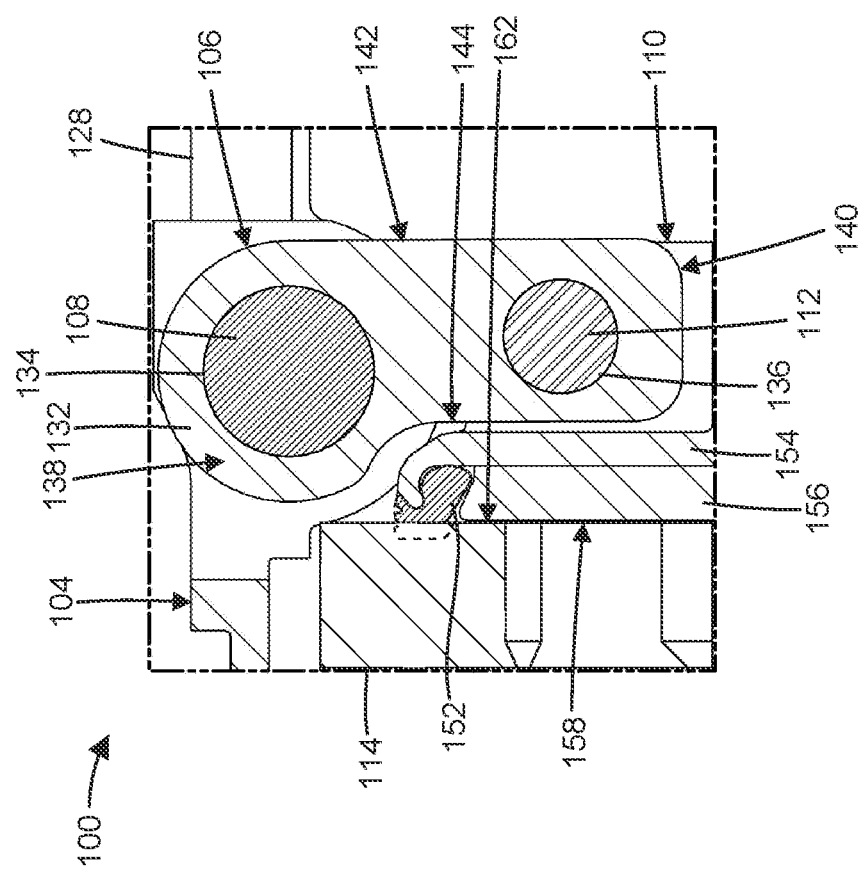
FIG. 4 is a diagram of a side section view of the example clapper valve assembly, described herein, in a hard stop position.

FIG. 2 is a diagram of a side section view of the example clapper valve assembly 100, described herein, in an open position. In FIG. 2, the valve body 102 is hidden for clarity. In the inset of FIG. 2, the link piece 106 is hidden for clarity. FIG. 3 is a diagram of a side section view of the example clapper valve assembly 100, described herein, in a closed position. In FIG. 3, the valve body 102 is hidden for clarity. FIG. 4 is a diagram of a side section view of the example clapper valve assembly 100, described herein, in a hard stop position. The portion of the clapper valve assembly 100 shown in FIG. 4 corresponds to the inset of FIG. 3. In some examples, the clapper valve assembly 100 may include less equipment, additional equipment, or alternative equipment compared to the example depicted in FIGS. 2-4.

As shown in the inset of FIG. 2, linear movement of the first pin 108, within the slot 130, may occur in a direction parallel to the longitudinal flow bore 118 (e.g., right/left in FIG. 2). In some examples, a first fit between the first pin 108 and the slot 130 of the hanger 104 may be looser than a bearing fit (e.g., clearance fit or other fits). Linear movement of the first pin 108 may be configured for self-alignment between the clapper 110 and the valve seat 114 to improve sealing. For example, self-alignment may compensate for geometrical deviations resulting from accumulation of geometrical tolerances during manufacturing.

For the clapper 110 to move from the open position (see FIG. 2) to the closed position (see FIG. 3), the link piece 106 may be configured to rotate, relative to the hanger 104, about the first rotation axis 146 of the first pin 108. In addition, the clapper 110 may be configured to rotate, independently of the link piece 106, about the second rotation axis 160 of the second pin 112. In some examples, a second fit between the second pin 112 and the third pin hole 150 of the clapper body 148 may be a bearing fit. In some examples, the first fit between the first pin 108 and the slot 130 of the hanger 104 may have greater clearance than the second fit between the second pin 112 and the third pin hole 150 of the clapper body 148. In some examples, the configuration of the link piece 106, described herein, may enable tighter clearances between parts, such that loading, abrasion, and/or wear effects, particularly associated with greater clearances between moving parts, may be reduced. For example, the first fit may be a bearing fit, such that both the first and second fits are bearing fits, thereby reducing cumulative clearances between moving parts.

In some examples, independent rotation of the link piece 106 and the clapper 110 may occur simultaneously and/or in sequential order. Independent rotation of the link piece 106 and the clapper 110 may cause linear movement of the clapper 110 between the closed position (see FIG. 3) and the hard stop position (see FIG. 4). In other words, linear movement of the clapper 110 may be configured to occur from initial contact between the seal 152 and the valve seat 114 (closed position) to final contact between a face 158 of the clapper body 148 and the valve seat 114 (hard stop position). In some examples, linear movement of the clapper 110 may be configured to occur during compression of the seal 152. For example, compression of the seal 152 is shown in FIG. 4 where a dashed line is used to illustrate a portion of the seal 152 in the uncompressed state. Linear movement of the clapper 110 may be, and/or defined, in a direction normal to the valve seat 114 (e.g., parallel to the longitudinal flow bore 118, or from right to left in FIGS. 3-4). In some examples, linear movement of the clapper 110 may be configured to occur when the clapper 110 is oriented perpendicular to the longitudinal flow bore 118 (e.g., fully vertical, or up and down in FIGS. 3-4). In some examples, linear movement of the clapper 110 may be configured to occur without sliding of the first pin 108 within the slot 130 (e.g., based only on the configuration of the link piece 106 with two pins, described herein, or in combination with only rotation of the first pin 108 being allowed and linear movement of the first pin 108 being prevented, such as when the slot 130 is replaced with a fourth pin hole).

In some examples, linear movement of the clapper 110 may be configured for self-alignment between the clapper 110 and the valve seat 114 to improve sealing. In some examples, self-alignment caused by linear movement of the clapper 110, based on rotation about the second rotation axis 160 of the second pin 112, may replace the self-alignment function associated with linear movement of the first pin 108 within the slot 130 (e.g., based only on the configuration of the link piece 106 with first and second pins 108, 112, described herein, whether or not linear movement of the first pin 108 is prevented). This modification, from sliding of the first pin 108 to rotation about the second pin 112, based on the configuration of the link piece 106, described herein, may reduce friction and extend part life.

As indicated above, FIGS. 2-4 are provided as an example. Other examples may differ from what was described in connection with FIGS. 2-4.

In oil and gas operations, a clapper valve may be used to control the flow of fluids by preventing backflow. Dynamic loading and/or abrasion caused by fluid flow through the clapper valve (e.g., including the effects of flow dynamics that cause cavitation and cyclic loading on parts) may cause significant wear to internal components of the clapper valve. Moreover, friction and wear caused by linear and/or rotary movement of parts (e.g., pins, pin holes, slots, or other parts) may shorten part life. Replacement and/or repair of worn parts is inefficient, time-consuming, and costly. The clapper valve assembly, and application thereof, described herein, reduces friction and wear, which drives efficiency, time savings, and cost savings.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A clapper valve assembly, comprising:
 a valve body defining a longitudinal flow bore;
 a hanger disposed in the valve body and including a slot;
 a link piece, including:
  a link body; and first and second pin holes defined in the link body;
a first pin disposed in both the slot of the hanger and the first pin hole of the link body,
wherein the first pin defines a first rotation axis, and
wherein the link piece is configured to rotate about the first rotation axis;
a clapper, including:
a clapper body;
a third pin hole defined in the clapper body; and
a seal;
a second pin disposed in both the second pin hole of the link body and the third pin hole of the clapper body,
wherein the second pin defines a second rotation axis,
wherein the clapper is configured to rotate about the second rotation axis, and
wherein a fit between the first pin and the slot of the hanger has greater clearance than a fit between the second pin and the third pin hole of the clapper body; and
a valve seat disposed in the valve body.

2. The clapper valve assembly of claim 1, wherein the link piece and the clapper are configured to rotate independently of each other.

3. The clapper valve assembly of claim 2, wherein the independent rotation of the link piece and the clapper causes linear movement of the clapper.

4. The clapper valve assembly of claim 3, wherein the linear movement of the clapper is normal to the valve seat.

5. The clapper valve assembly of claim 3, wherein the linear movement is configured to occur from initial contact between the seal and the valve seat to final contact between a face of the clapper body and the valve seat.

6. The clapper valve assembly of claim 1, wherein the first and second pins are disposed parallel to each other, and wherein the second pin is nearer a centerline of the longitudinal flow bore, compared to the first pin, when the clapper is in a closed position.

7. The clapper valve assembly of claim 1, wherein the first and second rotation axes are perpendicular to the longitudinal flow bore.

8. The clapper valve assembly of claim 1, wherein the link body includes:
a first end defining a rounded edge corresponding to the first pin hole,
wherein the link body has a first width and a first depth at the first end; and
a second end corresponding to the second pin hole,
wherein the link body has a second width and a second depth at the second end,
wherein the second width is less than the first width, and
wherein the second depth is less than the first depth.

9. The clapper valve assembly of claim 8, wherein the link body further includes:
a forward-facing surface connecting the first and second ends,
wherein the forward-facing surface is configured to face towards an outlet of the longitudinal flow bore when the clapper is in a closed position; and
a backward-facing surface connecting the first and second ends,
wherein the backward-facing surface is configured to face towards an inlet of the longitudinal flow bore when the clapper is in the closed position, and
wherein a length of the backward-facing surface defined between the rounded edge and the second end is less than a length of the forward-facing surface.

10. A link assembly for coupling a clapper to a hanger of a clapper valve, comprising:
a link piece, including:
a link body; and
first and second pin holes defined in the link body,
wherein the link body includes:
a first end corresponding to the first pin hole,
wherein the link body has a first width and a first depth at the first end; and
a second end corresponding to the second pin hole,
wherein the link body has a second width and a second depth at the second end,
wherein the second width is less than the first width, and
wherein the second depth is less than the first depth;
a first pin disposed in the first pin hole of the link body,
wherein the first pin defines a first rotation axis, and
wherein the link piece is configured to rotate, relative to the hanger, about the first rotation axis; and
a second pin disposed in the second pin hole of the link body,
wherein the second pin defines a second rotation axis, and
wherein the clapper is configured to rotate, independently of the link piece, about the second rotation axis.

11. The link assembly of claim 10, wherein the link piece and the clapper are configured to rotate independently of each other.

12. The link assembly of claim 11, wherein the independent rotation of the link piece and the clapper causes linear movement of the clapper.

13. The link assembly of claim 10, wherein the link body further includes:
a forward-facing surface connecting the first and second ends,
wherein the forward-facing surface is configured to face towards an outlet of the clapper valve when the clapper is in a closed position; and
a backward-facing surface connecting the first and second ends,
wherein the backward-facing surface is configured to face towards an inlet of the clapper valve when the clapper is in the closed position, and
wherein a length of the backward-facing surface defined between a rounded edge, defined at the first end and corresponding to the first pin hole, and the second end is less than a length of the forward-facing surface.

14. A clapper valve assembly, comprising:
a valve body defining a longitudinal flow bore;
a hanger disposed in the valve body and including a slot;
a link piece coupled to the hanger;
a first pin coupled between the hanger and the link piece,
wherein the link piece is configured to rotate, relative to the hanger, about the first pin;
a clapper coupled to the link piece; and
a second pin coupled between the link piece and the clapper,
wherein the clapper is configured to rotate, relative to the link piece, about the second pin, and wherein a fit between the first pin and the slot of the hanger has greater clearance than a fit between the second pin and a pin hole of the clapper.

15. The clapper valve assembly of claim 14, wherein the link piece and the clapper are configured to rotate independently of each other.

16. The clapper valve assembly of claim 15, wherein the independent rotation of the link piece and the clapper causes linear movement of the clapper.

17. The clapper valve assembly of claim 14, wherein the first and second pins are disposed parallel to each other, and wherein the second pin is nearer a centerline of the longitudinal flow bore, compared to the first pin, when the clapper is in a closed position.

18. The clapper valve assembly of claim 14, wherein the clapper includes:
- a clapper body,
  - wherein the pin hole is defined in the clapper body, and
  - wherein the pin hole is configured to receive the second pin; and
- a seal coupled to the clapper body.

\* \* \* \* \*